May 5, 1953  H. G. FOSTER  2,637,088
SNAPHOOK
Filed Dec. 23, 1949  2 SHEETS—SHEET 1
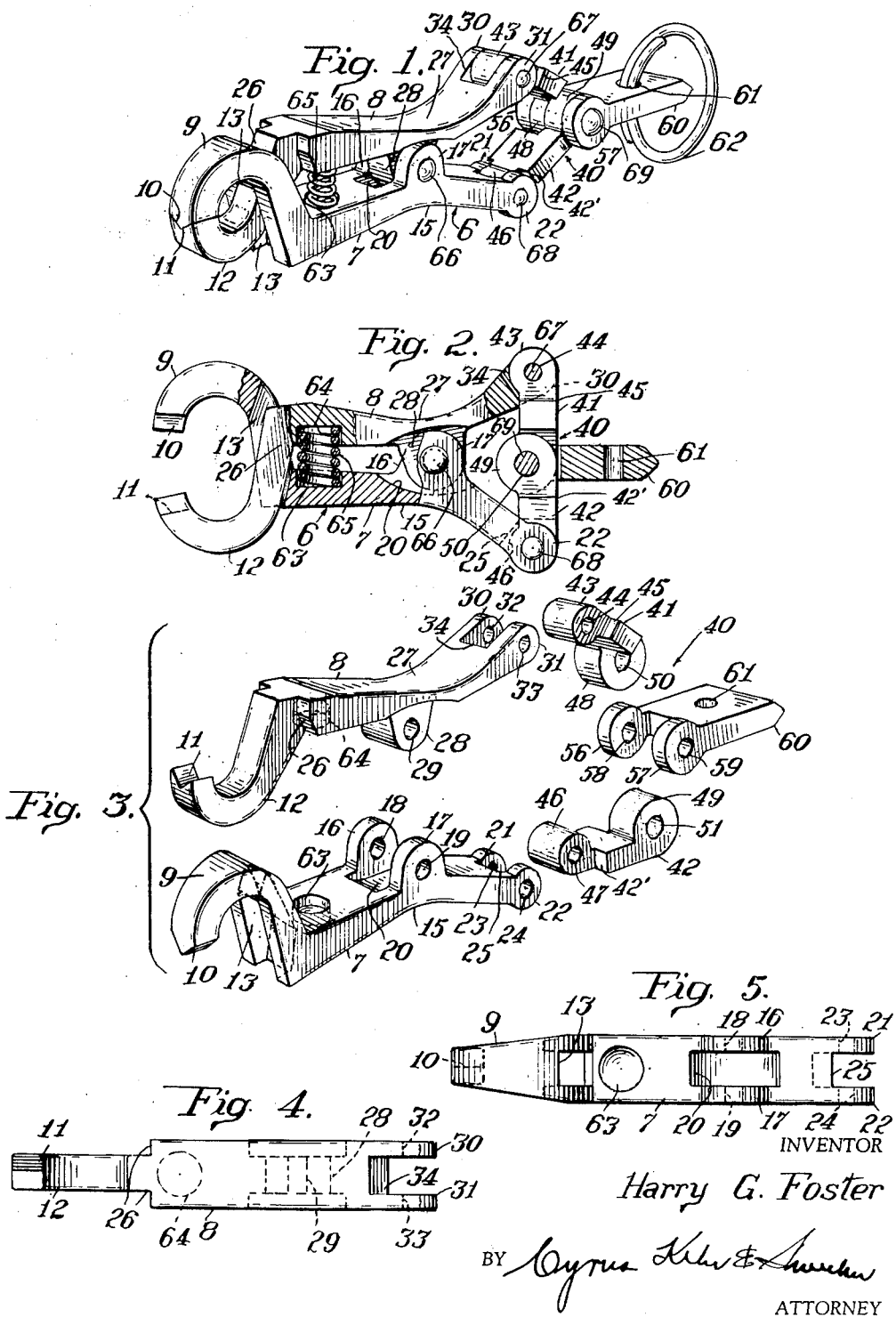
INVENTOR
Harry G. Foster
BY
ATTORNEY May 5, 1953      H. G. FOSTER      2,637,088
SNAPHOOK Filed Dec. 23, 1949      2 SHEETS—SHEET 2

INVENTOR
Harry G. Foster
BY *Cyrus Kehr & Sweeties*
ATTORNEYS

Patented May 5, 1953

2,637,088

UNITED STATES PATENT OFFICE 2,637,088

SNAPHOOK

Harry G. Foster, Mullens, W. Va.

Application December 23, 1949, Serial No. 134,747

7 Claims. (Cl. 24—234)

This invention relates to an improved snap hook, and is particularly adapted for snaps to hitch an animal, such as a dog or the like, by its harness to a leash or chain.

One object of this invention is to provide a snap hook so arranged that when in use, the greater the pull by the animal on the leash the tighter the jaws of the hook will hold.

A further object of this invention is to provide a snap hook which is provided with a simple but effective means that will hold said jaws in an open position, and which holding means can be released quickly by a simple tug or pull by either the animal or on the leash or chain and will cause the hook to close.

A further object of this invention is to provide a snap hook that is positive in action, simple and economical to manufacture and has a minimum number of moving parts therein.

Other objects and advantages of this invention will become apparent as the discussion proceeds and when considered in connection with the accompanying drawings, in which:

Fig. 1 is a perspective view of a snap hook embodying my invention, showing the jaws closed;

Fig. 2 is a longitudinal section of a snap hook embodying my invention, showing the jaws open;

Fig. 3 is an exploded perspective view of the several parts of the snap hook;

Figs. 4 and 5 are plan views of the respective jaws and body members of the snap hook shown in Figs. 1, 2 and 3;

Figure 6:
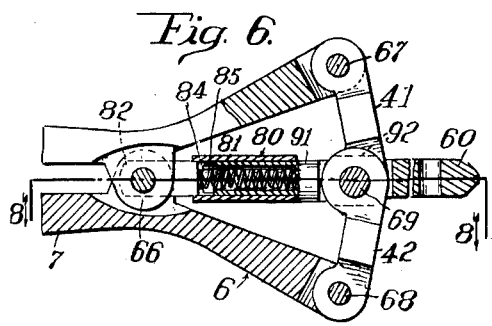
Fig. 6 is a partial longitudinal section of a modification of my invention including a locking device for the toggle, showing the parts in an open position of the snap.
Figure 7:
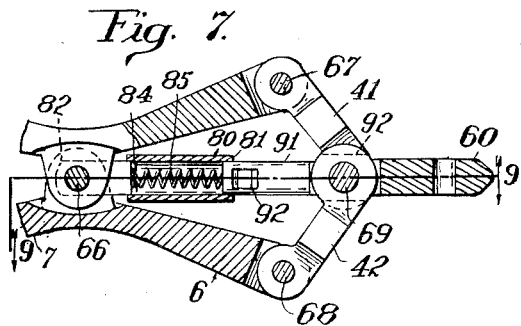
Fig. 7 is a similar view showing the parts in the closed position of the snap.
Figure 8:
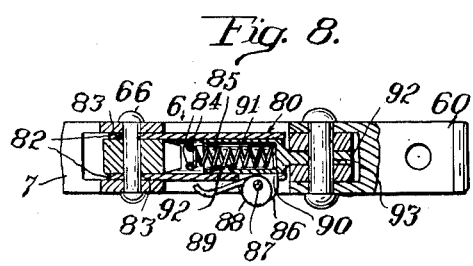
Figure 9:
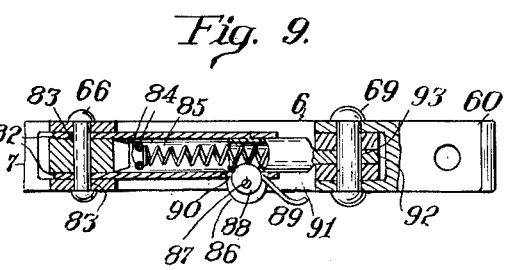
Figure 10:
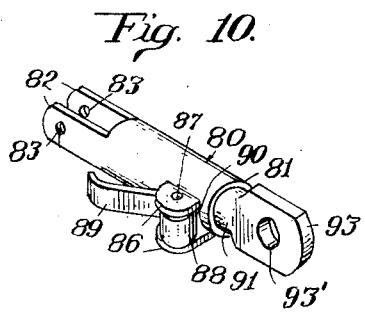
Figure 11:
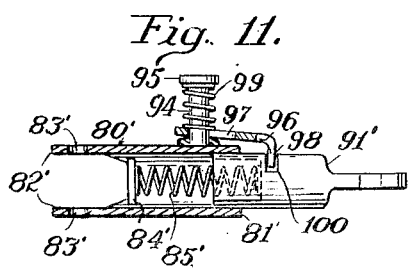

Figs. 8 and 9 are sectional views taken along the lines 8—8 and 9—9 of Figs. 6 and 7, respectively;

Fig. 10 is a perspective view of the locking device of my invention shown in Figs. 6-9, inclusive; and Fig. 11 is a longitudinal section of a modified form of the locking device embodying my invention.

Turning now to a detailed description of the drawings, the numeral 6 designates the assembled snap hook generally, which may be of any material desired, such as plastic, metal or the like. The snap hook 6 comprises a pair of cooperating body members 7 and 8 extending in side-by-side relation.

The body member 7 is provided with a jaw 9 on one end thereof, shown terminating in the form of a C hook. The end of the hook of the jaw 9 is shown as beveled as at 10, for cooperation with a companion bevel or recess 11 located in the end of a C hook forming the end of a jaw 12 on the body member 8.

The jaw 9 is provided with an opening 13, as best shown in Figs. 3 and 5. The opening 13 extends substantially through the back or curved portion of the jaw 9, as best shown in Fig. 5. The end of the jaw 12, in body member 8, is of reduced width relative to the remainder of the member 8, as shown, and forms shoulders 26 therewith. The end of the jaw 12 is of a width so as to fit slidably into the opening 13 of the jaw 9, thereby providing a crossed effect of said jaws, as shown in Figs. 1 and 2.

Intermediate the ends of the body members 7 and 8 are angular offsets 15 and 27, respectively. On the body member 7, on the side thereof opposite the offset 15, is a pair of upstanding supports 16 and 17, as best shown in the exploded view of Fig. 3. Holes 18 and 19, in axial alignment, are provided in the supports 16 and 17. On the side of body member 8 opposite from the offset 27 is a bearing member 28, provided with a hole 29. The bearing member 28 is interfitted into the supports 17 and 18, with the holes 18, 29 and 19 aligned, and a pin 66 is inserted therethrough to connect the members 7 and 8 pivotally together. A recess 20 is provided in body member 7, as shown, to afford free movement of bearing support 28 relative thereto.

Each body member 7 and 8, on the end opposite the jaws 9 and 12, is provided with extended supports 21, 22 and 30 and 31, respectively, as shown. In axial alignment through the supports are holes 23, 24 and 32 and 33. Recesses 25 and 34 are provided intermediate the supports to afford free movement of a toggle linkage 40.

The toggle linkage, designated generally by the numeral 40, is pivotally connected to the supports 21, 22 and 30 and 31, and comprises a pair of links 41 and 42, each having a bearing 43 and 46, respectively, on one end thereof. The bearings 43 and 46 are of reduced width relative to the main body of the links 41 and 42 and form shoulders 42′ and 45 therewith respectively, and are provided with holes 44 and 47 therethrough. The bearings 43 and 46 are pivotally connected to the supports 30, 31 and 21 and 22, respectively, by pins 67 and 68, as shown in Figs. 1 and 2.

On the ends of the links 41 and 42, opposite the bearings 43 and 46, is a second set of bearings 48 and 49. The bearings 48 and 49 are oppositely offset on the links, as shown, so as to form a flush joint when assembled together. Holes 50 and 51 are provided in the bearings 48 and 49 respectively.

Embracing the bearings 48 and 49 is a pair of supports 56 and 57, provided with holes 58 and 59 in axial alignment therethrough. A pin 69 pivotally holds the bearings 48 and 49 in the supports 56 and 57. The supports 56 and 57 are provided with a tab or like member 60 through which a hole passes. A ring 62, for attachment to a leash or the like, may be inserted into the hole 61.

Recesses 63 and 64 are provided in the jaws 9 and 12, respectively, as shown, and are adapted to receive an expansion spring or the like 65 therein. The spring 65 urges the jaws 9 and 12 into a closed position, as shown in Fig. 1.

The operation of the assembled snap is briefly described as follows:

The body members 7 and 8 being pivoted about the pin 66, and provided with the spring 65 located intermediate the pin 66 and the point where the jaws 9 and 12 cross, it will be seen that the jaws are constantly urged into a closed position, as shown in Fig. 1. When it is desired to open the jaws 9 and 12, a simple pressure may be applied in opposed directions to the body members 7 and 8 just above the spring member 65. This will urge the compression of the spring 65 and in turn will force the jaws into the open position shown in Fig. 2.

As the same time the compression of the spring 65 and opening of the jaws 9 and 12 will cause the opposite ends of the body members 7 and 8, carrying the supports 21, 22, 30 and 31, to open outwardly, as shown in Fig. 2, which in turn will cause the links 41 and 42 of the toggle 40 to move into a straight aligned relation, as shown in Fig. 2. When the jaws 9 and 12 are completely compressed and the links 41 and 42 are in alignment, the component of force on the end members represented by the supports 21, 22, 30 and 31 will be completely counteracted by the links 41 and 42, and the jaws 9 and 12 will be held open.

Now when it is desired to close the jaws 9 and 12, it is merely necessary to give a tug or pull sufficient to move the links 41 and 42 slightly out of alignment toward their position shown in Fig. 1. The spring 65, once the links 41 and 42 are pulled a sufficient distance out of alignment to overcome the normal friction of the bearing surfaces of the snap, will cause the jaws 9 and 12 to snap completely closed, as shown in Fig. 1.

Any further pull on the member 60 will tend to urge the links 41 and 42 further out of axial alignment and will pull the jaws 9 and 12 more tightly together. Thus, the harder an animal pulls on its leash or chain, the tighter the grip of the jaws 9 and 12.

The modification of my snap shown in Figs. 6 and 7, includes a locking device for retaining the jaws 9 and 12 in a closed position. A telescoping link 80 is provided between the pins 66 and 69. Said link 80 is formed of tubular members 81 and 91. The member 81 has a pair of fingers 82 on one end thereof provided with aligned openings 83 through which the pin 66 is inserted. A bridge 84, formed by pins or the like, is provided to abut one end of a spring 85, the opposite end of which spring bears against the closed end of the member 91, urging the members 81 and 91 apart.

Midway between the ends of the tubular member 81 and at right angles to the fingers 82 is a pair of offset supports 86 having aligned holes therein through which a pin 87 passes and rotatably holds a cam member 88 operated by a lever 89. As will be seen from a study of Figs. 8 and 9, the lobe of the cam 88 rotates through an opening 90 formed in the tubular member 81 by virtue of the upstanding arms 86.

Telescoping into the member 81 is a second tubular member 91 having a finger 93 formed at one end thereof provided with a hole 93' through which the pin 69 is inserted. The spring 85 is inserted within the tubular member 91, as shown in Figs. 8 and 9. An opening or slit 92 is formed in the tubular member 91 and is adapted to receive the cam 88 when the lever 89 is in the position shown in Fig. 9. In this position, the locking device is closed and the jaws 9 and 12 are thereby positively locked against inadvertent opening of the snap while the animal is tethered thereto.

When it is desired to open the jaws of the hook, the lever 89 is turned to the position shown in Fig. 8, rotating the cam 88 out of the opening 92 and permitting the member 91 to telescope into the tubular member 81. When it is desired to again lock the jaws 9 and 12 closed, it is a simple matter to flip the lever 89 from the position shown in Fig. 8 to the position shown in Fig. 9.

In the modification of my locking device shown in Fig. 11, there is again provided a tubular member 81' having a pair of fingers 82' with a pair of aligned openings 83' in one end thereof for insertion of the pin 66. Likewise, there is a bridge 84' against which a spring 85' abuts, similar to the bridge 84 and spring 85 described above. Telescoped within the tubular member 81' is a second tubular member 91'.

Welded or otherwise securely affixed to the outside tubular member 81' is a pin 94' provided with a head 95. Mounted for longitudinal slidable movement upon the pin 94 is a plate 96 provided with an elongated slot 97 receiving the pin 94 adjacent one end thereof and with a downwardly depending lip 98 at the opposite end. As will be seen from Fig. 11, the plate 96 is adapted to slide longitudinally a short distance of the length of the tubular member 81', being limited in movement by the length of the slot 97. A spring 99 constantly urges the plate 96 against the tubular member 81 and serves the purpose of acting as a friction drag against the member 96.

The depending lip 98 engages an opening 100 provided in the tubular member 91'. When the lip 98 is in the opening 100, the tubular member 91' will be limited in its telescoping movement relative to the member 81'. However, if it is desired to move further the member 91' into or out of the member 81', the member 96 can be pulled upwardly manually toward the collar 95 compressing the spring 99 and withdrawing the depending finger 98 from the opening 100. This will permit free sliding movement of the member 91' within the member 81'; and when it is desired to lock the snap closed again, the member 98 is merely released and dropped into the opening 100.

As shown also in Fig. 6, the parts of the toggle may be so arranged, with the links 41 and 42 out of longitudinal alignment, that the jaws of the snap will close automatically when released. Furthermore, the spring 85, connected as shown in Figs. 6 and 7 makes unnecessary the use of the spring 65 between the jaws 9 and 12, and the latter spring may be omitted if desired.

Various changes in position of the pivotal points and various types of material, as well as particular configuration of the jaws, toggle and interlocking members, may be resorted to without deviating from the spirit of this invention.

I claim:

1. A snap hook comprising a pair of body members pivoted together intermediate their ends, said body members lying in a substantially aligned relation, a pair of cooperating jaws carried on the ends of said body members, said jaws being in crossed cooperating relation to each other between the pivot and the ends thereof, and toggle linkage means pivotally connecting together the ends of said body members at the end thereof opposite said jaws, said toggle linkage means comprising a pair of links, each link being pivoted at one end to the end of one body member, and said links being pivoted together at their opposite ends intermediate the ends of said body members, said toggle linkage means being adapted to hold the jaws in an open position when their intermediate connection is in substantial alignment with the ends of said body members, and to urge said jaws into a closed position when said intermediate connection is moved out of alignment from the ends of said body members.

2. A snap hook comprising a pair of body members pivoted together intermediate their ends, said body members lying in a substantially aligned relation, a pair of cooperating crossed jaws carried on the ends of said body members, hooks formed on the ends of said jaws, one of said hooks having an elongated opening therein, the other hook having a reduced shank slidably extending through said opening, said hooks being inverted in respect to each other so that when said jaws are forced together intermediate the pivot and the point at which said jaws cross the hooks will open, a coiled spring interposed between the body members at a point between the pivot and the point at which said jaws cross urging said hooks closed, and a pair of toggle links pivotally connected to the ends of the body members opposite said hooks, said links each being pivotally connected at one end to one of each of said body members, and said links being pivotally connected together at their opposite ends intermediate the ends of said body members, said links being adapted to hold the hooks in an open position when their intermediate connection is in substantial alignment with the ends of said body members, and to urge said hooks into a closed position when said intermediate connection is moved out of alignment from the ends of said body members.

3. A snap hook comprising a pair of body members pivoted together intermediate their ends, jaws on adjacent ends of said body members, toggle means connecting together the opposite ends of said body members, a telescoping link having inner and outer members slidably interfitted, said telescoping link being connected at one end to said toggle means, and cam locking means pivotally carried upon one of said telescoping members, the other of said telescoping members having an opening formed in a side thereof in a position to be engaged by said cam to lock said telescoping link in a set position.

4. A snap hook comprising a pair of body members pivoted together intermediate their ends, jaws on adjacent ends of said body members, toggle means connecting together the opposite ends of said members, a telescoping resilient device connected at one end to the toggle means and at the opposite end to one of the jaws at the pivot urging said jaws closed, said telescoping device having an inner and an outer member and locking means carried by one of said telescoping members to lock said jaws closed, said locking means comprising a slidable plate, a pin carried upon one of the telescoping members and slidably supporting said plate, resilient means mounted on said pin urging said slidable plate against said telescoping member, and a depending finger carried on said slidable plate cooperating with a recess provided in the second telescoping member.

5. A snap hook comprising a pair of body members pivoted together intermediate their ends, a pair of cooperating jaws carried on adjacent ends of said body members, said jaws being in crossed cooperating relation to each other between the pivot and the ends thereof, toggle linkage means pivotally connecting together the ends of said body members at the end thereof opposite said jaws, said toggle linkage means comprising a pair of links, each link being pivoted at one end to the end of one body member, said links being pivoted together at their opposite ends intermediate the ends of said body members, a pair of telescoping members connected at one end to the intermediate pivot connection of said toggle linkage means and to the pivot of said jaws at the other end, resilient means carried by said telescoping members urging said telescoping members apart, and locking means carried upon said telescoping members to lock the same together and thereby lock the jaws in a closed position, said locking means comprising a cam pivotally mounted on one of said telescoping members, the other of said telescoping members having an opening formed in a side thereof in position to be engaged by said cam.

6. A snap hook comprising a pair of body members extending in substantially parallel side-by-side relation, means at the inner sides of the members pivotally connecting the members together for relative swinging movement about an axis spaced from said respective members intermediate thereof, a pair of cooperating crossed jaws carried on the ends of said body members, a hook formed on one end of each of said jaws, one of said hooks having an elongated opening therein, the other hook having a reduced shank slidably extending through said opening, a spring interposed between the body members at a point between the pivot and the point at which the jaws cross urging said hooks closed, said hooks being inverted with respect to each other so that when said members are forced together intermediate the pivot and the point at which said jaws cross the hooks will open.

7. A snap hook comprising a pair of body members extending in substantially parallel side-by-side relation, means at the inner sides of the members pivotally connecting the members together for relative swinging movement about an axis spaced from said respective members intermediate thereof, a pair of cooperating crossed jaws carried on the ends of said body members, a hook formed on one end of each of said jaws, one of said hooks having an elongated opening therein, the other hook having a reduced shank slidably extending through said opening, and a coiled spring interposed between the body members and extending transversely thereof at a point between the pivot and the point at which said jaws cross urging said hooks closed, said body members having thumb pressure portions on the outer faces thereof adjacent the opposite ends of the coiled spring for pressing said members inwardly toward each other against the tension of the spring, said hooks being inverted with respect to each other so that when said members are forced together at said thumb portions the hooks will open.

HARRY G. FOSTER.

References Cited in the file of this patent

UNITED STATES PATENTS

| Number | Name | Date |
|---|---|---|
| 196,664 | Havell | Oct. 30, 1877 |
| 790,329 | Taylor | May 23, 1905 |
| 958,594 | Carroll | May 17, 1910 |
| 1,056,343 | Kromann | Mar. 18, 1913 |
| 1,172,915 | Stevens | Feb. 22, 1916 |
| 1,422,765 | Johnson | July 11, 1922 |
| 1,521,903 | Mueller | Jan. 6, 1925 |
| 1,758,038 | Hancock | May 13, 1930 |
| 2,118,475 | Pallas | May 24, 1938 |
| 2,576,261 | Minor | Nov. 27, 1951 |

FOREIGN PATENTS

| Number | Country | Date |
|---|---|---|
| 539,778 | France | Apr. 7, 1922 |